(12) United States Patent
Miyake et al.

(10) Patent No.: US 6,924,762 B2
(45) Date of Patent: Aug. 2, 2005

(54) RADAR DESIGNED TO ACQUIRE RADAR DATA WITH HIGH ACCURACY

(75) Inventors: Yasuyuki Miyake, Toyota (JP); Kazuma Natsume, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/844,600

(22) Filed: May 13, 2004

(65) Prior Publication Data

US 2004/0252047 A1 Dec. 16, 2004

(30) Foreign Application Priority Data

May 15, 2003 (JP) ........................................ 2003-137904

(51) Int. Cl.[7] .............................................. G01S 13/42
(52) U.S. Cl. ........................ 342/70; 342/109; 342/111; 342/113; 342/115; 342/116; 342/128; 342/129; 342/133; 342/139; 342/146; 342/192; 342/196
(58) Field of Search ...................... 342/70–72, 98–102, 342/107, 111, 113, 115, 116, 128, 129, 133–135, 139, 146, 156–158, 192, 194–196, 147

(56) References Cited

U.S. PATENT DOCUMENTS

| | | | | |
|---|---|---|---|---|
| 5,731,778 A | * | 3/1998 | Nakatani et al. | 342/70 |
| 5,751,240 A | * | 5/1998 | Fujita et al. | 342/70 |
| 5,757,307 A | | 5/1998 | Nakatani et al. | |
| 6,121,917 A | * | 9/2000 | Yamada | 342/128 |
| 6,317,073 B1 | * | 11/2001 | Tamatsu et al. | 342/70 |
| 6,320,531 B1 | * | 11/2001 | Tamatsu | 342/109 |
| 6,337,656 B1 | * | 1/2002 | Natsume et al. | 342/149 |
| RE37,725 E | * | 6/2002 | Yamada | 342/72 |
| 6,646,589 B2 | * | 11/2003 | Natsume | 342/70 |
| 2001/0015698 A1 | * | 8/2001 | Tokoro | 342/70 |
| 2003/0052813 A1 | * | 3/2003 | Natsume | 342/70 |
| 2003/0112173 A1 | * | 6/2003 | Seki et al. | 342/70 |

FOREIGN PATENT DOCUMENTS

JP 9-152478 6/1997

OTHER PUBLICATIONS

"Target distance and velocity measurement algorithm to reduce false targets in FMCW automotive radar", Mitsumoto-M; Uehar N, Inatsune-S; Kirimoto-T. IEICE-Transactions-on-Communications (Japan), vol. E83-B, No. 9, p. 1983-9, Sep. 2000.*

* cited by examiner

Primary Examiner—John B. Sotomayor
(74) Attorney, Agent, or Firm—Posz Law Group, PLC

(57) ABSTRACT

A radar is provided which transmits a radar wave whose frequency is so modulated as to rise, fall, and be kept constant cyclically. The radar uses beat signals produced by the radar wave and radar echoes received by two antennas to produce radar data on a target. When it is impossible to pair frequency peaks of the beat signals in a modulated frequency-rising and -falling ranges, the radar determines that the frequency peaks have arisen from different objects so that they overlap each other and uses frequency peaks of the beat signals in a constant modulated frequency range to acquire the radar data.

12 Claims, 12 Drawing Sheets

RADAR DESIGNED TO ACQUIRE RADAR DATA WITH HIGH ACCURACY

BACKGROUND OF THE INVENTION

1. Technical Field of the Invention

The present invention relates generally to a radar such as an FMCW (Frequency Modulated Continuous Wave) radar which is designed to transmit a frequency-modulated radar wave and receive a return thereof from an object through a plurality of antennas to determine the distance to, relative speed, and azimuth or angular direction of the object.

2. Background Art

Monopulse radars are known as automotive radars. For example, U.S. Pat. No. 5,757,307 discloses such a radar. The monopulse radar works to receive a radar echo from a reflective object through two antennas arrayed at a given interval away from each other and determine an azimuth or angular direction of the object based on a phase difference between signals received by the antennas. The principle of determining the angular direction will be described below in brief.

Consider a radar system, as illustrated in FIG. 13, in which two antennas A1 and A2 which are located at an interval D away from each other receive a radar return which has a wave length $\lambda$ and has been reflected from an object M existing in a direction making an angle $\theta$ with a line extending perpendicular to planes of the antennas A1 and A2. Paths along which the radar return travels from the object M to the respective antennas A1 and A2 are different in length by a distance $\Delta d$. The path length difference $\Delta d$ depends upon the angle $\theta$ which the line extending perpendicular to the planes of the antennas A1 and A2 makes with the direction of the radar return. The angular direction (i.e., the angle $\theta$) of the object M may, thus, be determined using a phase difference $\Delta\phi$ between the signals received by the antennas A1 and A2 which may be considered as the path length difference $\Delta d$. The relation between the phase difference $\Delta\phi$ and the angle $\theta$ is given by the following equation:

$$\Delta\phi = (2\pi/\lambda)D \sin\theta \qquad (1)$$

When the angle $\theta$ is small sufficiently, $\sin\theta$ may be considered to be equal to $\theta$ (i.e., $\sin\theta \approx \theta$). Eq. (1) may be rewritten, as shown below, in terms of the angle $\theta$.

$$\theta = \Delta\phi \cdot \lambda/(2\pi \cdot D) \qquad (2)$$

How to determine the phase difference a $\Delta\phi$ will be described below.

The radar system works to transmit a triangular wave radar signal which is frequency-modulated to have a frequency increasing and decreasing, i.e., sweeping upward and downward cyclically in a linear fashion and receive a return of the transmitted radar signal from the object M through the antennas A1 and A2. The radar system mixes portions of a signal received by each of the antennas A1 and A2 within ranges where the frequency of the transmitted signal sweeps upward and downward (will also be referred to as modulated frequency-rising and -falling ranges below) with the transmitted signal to produce frequency signals whose frequencies are equal to differences in frequency between the portions of the received signal and the transmitted signal (will also be referred to as a frequency-rising range beat signal and a frequency-falling range beat signal below). Note that the modulated frequency-rising and -falling ranges are also called an up-chirp and a down-chirp, respectively. Next, the radar system samples the frequency-rising and -falling range beat signals in sequence and subjects them to Fast Fourier Transform (FFT) to produce frequency spectra thereof in the modulated frequency-rising and -falling ranges. The frequency spectra are derived as complex vectors in each of a series of frequencies.

The radar system searches frequency peaks from absolute values of the complex vectors in each of the modulated frequency-rising and -falling ranges. The frequency peaks in the modulated frequency-rising and -falling ranges arise from a radar return from a reflective object and depend upon the distance to and relative speed of the object. Next, the radar system determines phases of the beat signals at the frequency peaks in the modulated frequency-rising and -falling ranges. The phases are each derived by, for example, the angle which the complex vector makes with a real number axis. The radar system finds a difference in phase between the frequency peaks of the received signals in the modulated frequency-rising range and also a difference in phase between the frequency peaks of the received signals in the modulated frequency-falling range.

The radar system elects one of the phase differences in the modulated frequency-rising and -falling ranges as the phase difference $\Delta\phi$ and determines the angular direction of the object M according to Eq. (2), as described above.

The frequency peaks in the modulated frequency-rising and -falling ranges are also used to determine the distance to and the relative speed of the object M. This will be described below with reference to FIGS. 14(a) and 14(b).

When an automotive vehicle equipped with a radar is traveling at the same speed as that of a reflective object, that is, when the relative speed V of the object is zero (0), a radar return from the object undergoes a time lag equivalent to a time interval between transmission of a radar wave and reception the echo (i.e., a time required for the radar wave to travel twice the distance D between the radar and the object). Specifically, as illustrated in FIG. 14(a), a radar-received signal fr is shifted in the time domain by such a time lag from a transmit signal fs, so that the frequency peak fbu in the modulated frequency-rising range (will also be referred to as an upward frequency peak below) will be identical with the frequency peak fbd in the modulated frequency-falling range (will also be referred to as a downward frequency peak below).

When the radar-equipped vehicle is traveling at a speed different from that of the object, that is, when the relative speed V is not zero (0), it will cause a radar return from the object to undergo a Doppler shift as a function of the relative speed V between the radar-equipped vehicle and the object. The received signal fr is, thus, shifted in frequency by an amount corresponding to the Doppler shift as well as the time lag that is, as described above, a function of the distance D to the object. This causes, as shown in FIGS. 14(a) and 14(b), the upward frequency peak fbu to be different from the downward frequency peak fbd (fbu≠fbd).

Specifically, the received signal fr is shifted in the time and frequency domains as functions of the distance D to and the relative speed V of the object. In other words, a difference in frequency between the transmitted signal fs and the received signal fr in the time domain (will also be referred to as a frequency fb below) is a function of the distance D to the object, while a difference in frequency therebetween in the frequency domain (will also be referred to as a frequency fd below) is a function of the relative speed V of the object. The frequencies fb and fd are expressed below.

$$fb = (|fbu| + |fbd|)/2 \qquad (3)$$

$$fd = (|fbu| - |fbd|)/2 \qquad (4)$$

Using the frequencies fb and fd, the distance D to and relative speed V of the object may be expressed as:

$$D=\{C/(4\times\Delta F\times fm)\}\times fb \quad (5)$$

$$V=\{C/(2\times fo)\}\times fd \quad (6)$$

where $\Delta F$ is a variation in frequency (i.e., amplitude) of the transmitted signal fs, fo is a central frequency of the transmitted signal fs, fm is a modulating frequency of the transmitted signal fs, and c is the velocity of light.

If there are a plurality of objects reflecting a radar wave, as many upward frequency peaks fbu and downward frequency peaks fbd as the objects appear. Determination of the distance D to and the relative speed V of each object, thus requires pairing of each of the upward frequency peaks fbu with a corresponding one of the downward frequency peaks fbd. For example, ones of the upward frequency peaks fbu and the downward frequency peaks fbd which have phase differences $\Delta\phi$ close to each other may be paired. This is based on the fact that combinations of the upward and downward frequency peaks fbu and fbd having close phase differences $\Delta\phi$ may be considered to have arisen from the same objects, respectively.

However, if frequency peaks arising from a plurality of objects overlap each other, it will cause composite phases to be derived each of which is a mix of phases of radar returns from the objects, thus resulting in a difficulty in pairing the upward and downward frequency peaks fbu and fbd correctly, which leads to errors in determining the distance to, angular direction, and relative speed of each object.

SUMMARY OF THE INVENTION

It is a first object of the present invention to provide a radar apparatus for vehicles which is designed to determine an angular direction of a target correctly even if the upward and downward frequency peaks arising from a plurality of objects overlap each other.

It is a second object of the invention to provide a radar apparatus for vehicles which works to eliminate an error in determining an angular direction of a target, etc. even if a condition where it is impossible to determine an angular direction of a target correctly using the upward and downward frequency peaks is encountered.

According to one aspect of the invention, there is provided a radar apparatus for achieving the first object of the invention which may be installed in an automotive vehicle to detect an object present ahead to determine the distance to, relative speed, and azimuth or angular direction of the object. The radar apparatus comprises: (a) a transmitter working to emitting a transmit signal in the form of a radar wave which has a frequency so modulated as to increase, decrease, and be kept constant in sequence; (b) a first and a second receiver circuit including a first and a second antenna located at a given interval away from each other, the first and second receiver circuits each working to receive a return of the radar wave from an object to produce receive signals and produce a first and a second beat signal each of which has a frequency corresponding to a difference in frequency between the transmit signal and a corresponding one of the receive signals, each of the first and second beat signals having a first frequency component in a modulated frequency-rising range wherein the frequency of the transmit signal increases, a second frequency component in a modulated frequency-falling range wherein the frequency of the transmit signal decreases, and a third frequency component in a constant modulated frequency range wherein the frequency of the transmit signal is kept constant; and (c) a signal processor working to determine an angular direction of the object using the receive signals provided by the first and second receiver circuits. The signal processor includes a first and a second angular direction determining section. The first angular direction determining section determines the angular direction of the object based on a phase difference between the first and second beat signals at a peak frequency that is at least one of frequencies of the first and second beat signals in at least one of the modulated frequency-rising and -falling ranges which have peaks. When peak frequencies that are frequencies of the first and second beat signals arising form a plurality of objects which have peaks in at least one of the modulated frequency-rising and -falling ranges overlap each other, the second angular direction determining section determines the angular direction of the object using a phase difference between the first and second beat signals at peak frequencies that are frequencies of the first and second beat signals in the constant modulated frequency range.

In a case where a vehicle equipped with the radar apparatus is traveling on one of traffic lanes of a road, and the radar apparatus is tracking a plurality of preceding vehicles existing over different ones of the traffic lanes, it is rare that the preceding vehicles are traveling at the same distance from the radar-equipped vehicle and at the same speed relative to the radar-equipped vehicle. In most cases, some of the preceding vehicles traveling on a passing lane are greater in speed than the others traveling on a cruising lane or a truck lane. Additionally, all the preceding vehicles are usually traveling at different distances from the radar-equipped vehicle. Therefore, the peak frequencies arising from the preceding vehicles overlap each other in at least one of the modulated frequency-rising and -falling ranges are often identical with each other. The peak frequencies in the constant modulated frequency range are each obtained only as a function of relative speeds of the preceding vehicles, respectively, and they are, in most cases, shifted from each other. It is, thus, possible to determine the angular directions of the preceding vehicles correctly using phase differences between the first and second beat signals at the peak frequencies in the constant modulated frequency range.

In the preferred mode of the invention, the first angular direction determining section works to determine as the angular direction of the object a first angular direction based on a phase difference between the first and second beat signals at the peak frequency in the modulated frequency-rising range and a second angular direction based on a phase difference between the first and second beat signals at the peak frequency in the modulated frequency-falling range. When a first condition where a difference between the first and second angular directions is smaller than a given value and a second condition where a difference in intensity between the peak frequencies in the modulated frequency-rising and -falling ranges is smaller than a given value are both met, the signal processor determines the peak frequencies in the modulated frequency-rising and -falling ranges to have arisen from the same object and combines the peak frequencies in the modulated frequency-rising and -falling rages to produce a peak frequency pair. The signal processor determines a distance to and a relative speed of the object using the peak frequency pair. When the first and second conditions are not encountered, the second angular direction determining section determines the angular direction of the object. Specifically, when the first and second conditions are not encountered, it means that there is a high possibility that the peak frequencies arising from different objects overlap each other. The second angular direction determining section is used to determine the angular direction of each object.

The second angular direction determining section may work to determine whether the peak frequencies in the modulated frequency-rising and -falling ranges are shifted from each other by a degree matching a relative speed of the object as indicated by the peak frequencies in the constant modulated frequency range. If a positive answer is obtained, the second angular direction determining section determines the angular direction of the object using the peak frequencies in the constant modulated frequency range.

If it is determined that the peak frequencies in the modulated frequency-rising and -falling ranges are shifted from each other by the degree matching the relative speed of the object as indicated by the peak frequencies in the constant modulated frequency range, the signal processor may combine the shifted peak frequencies to produce a peak frequency pair for use in determining the angular direction of the object.

According to the second aspect of the invention, there is provided a radar apparatus for a vehicle for achieving the second object of the invention. The radar apparatus comprises: (a) a transmitter working to emitting a transmit signal in the form of a radar wave which has a frequency so modulated as to increase and decrease in sequence; (b) a first and a second receiver circuit including a first and a second antenna located at a given interval away from each other, the first and second receiver circuits each working to receive a return of the radar wave from an object to produce receive signals and produce a first and a second beat signal each of which has a frequency corresponding to a difference in frequency between the transmit signal and a corresponding one of the receive signals, each of the first and second beat signals having a first frequency component in a modulated frequency-rising range wherein the frequency of the transmit signal increases and a second frequency component in a modulated frequency-falling range wherein the frequency of the transmit signal decreases; and (c) a signal processor working to determine an angular direction of the object using the receive signals provided by the first and second receiver circuits. The signal processor is designed to perform a angular direction determining function and a prohibiting function. The angular direction determining function serves to determine the angular direction of the object based on a phase difference between the first and second beat signals at a peak frequency that is at least one of frequencies of the first and second beat signals in at least one of the modulated frequency-rising and -falling ranges which have peaks. The prohibiting function serves to verify a measure of correctness of waveform representing the peak frequency in each of the modulated frequency-rising and -falling ranges. When the measure of correctness in each of the modulated frequency-rising and -falling ranges is lower than a given degree, the prohibiting function is performed to prohibit the angular direction determining function from determining the angular direction of the object, thereby eliminating an error in determining the angular direction of the object.

In the preferred mode of the invention, when an integral value of at least one of the first and second beat signals in each of the modulated frequency-rising and -falling ranges is smaller than a given threshold, the prohibiting function of the signal processor may be performed to prohibit the angular direction determining function from determining the angular direction of the object. Specifically, when the integral value is smaller than the threshold, it usually means that a number of peak frequencies arising from a roadside object such as a guardrail appear or that addition of electrical noises to the beat signals results in elevation in level of the beat signals as a whole. Thus, when such a condition is met, it is advisable that the prohibiting function of the signal processor be performed to prohibit the angular direction determining function from determining the angular direction of the object.

The signal processor may store therein history data on the peak frequencies in at least one of the modulated frequency-rising and -falling ranges. When the signal processor has an assumption that some of the peak frequencies will overlap each other based on changes in the peak frequencies stored as the history data, the signal processor may determine that the measure of correctness is lower than the given degree and performs the prohibiting function to prohibit the angular direction determining function from determining the angular direction of the object.

The radar apparatus may further include an image capture device which captures an image of a view to which the radar wave is emitted. When the presence of an object reflecting the radar wave at an intensity higher than a given threshold is confirmed from the captured image, the signal processor may determine that the measure of correctness is lower than the given degree and perform the prohibiting function to prohibit the angular direction determining function from determining the angular direction of the object.

The radar apparatus may also include a vehicle position determining device which determines a position of a vehicle equipped with the radar apparatus. When the position as determined by the vehicle position determining device indicates the fact that the vehicle is traveling in a tunnel, the signal processor may determine that the measure of correctness is lower than the given degree and perform the prohibiting function to prohibit the angular direction determining function from determining the angular direction of the object.

The radar apparatus may also include a steering position sensor which measures an angular position of a steering wheel of a vehicle equipped with the radar apparatus. When the steering position sensor indicates that the angular position of the steering wheel is greater than a given threshold, the signal processor may determine that the measure of correctness is lower than the given degree and perform the prohibiting function to prohibit the angular direction determining function from determining the angular direction of the object.

The angular direction determining function may serve to determine as the angular direction of the object a first angular direction based on a phase difference between the first and second beat signals at the peak frequency in the modulated frequency-rising range and a second angular direction based on a phase difference between the first and second beat signals at the peak frequency in the modulated frequency-falling range. When a first condition where a difference between the first and second angular directions is smaller than a given value and a second condition where a difference in intensity between the peak frequencies in the modulated frequency-rising and -falling ranges is smaller than a given value are met, the signal processor determines the peak frequencies in the modulated frequency-rising and -falling ranges to have arisen from the same object and combines the peak frequencies in the modulated frequency-rising and -falling rages to produce a peak frequency pair. The signal processor determines a distance to and a relative speed of the object using the peak frequency pair. When the number of peak frequency pairs as produced by the signal processor is smaller than a given value, the signal processor determines that the measure of correctness is lower than the given degree and performs the prohibiting function to prohibit the angular direction determining function from determining the angular direction of the object.

When the number of the peak frequencies in at least one of the modulated frequency-rising and -falling ranges is smaller than a given value, the signal processor may determine that the measure of correctness is lower than the given degree and perform the prohibiting function to prohibit the angular direction determining function from determining the angular direction of the object.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figure 1:
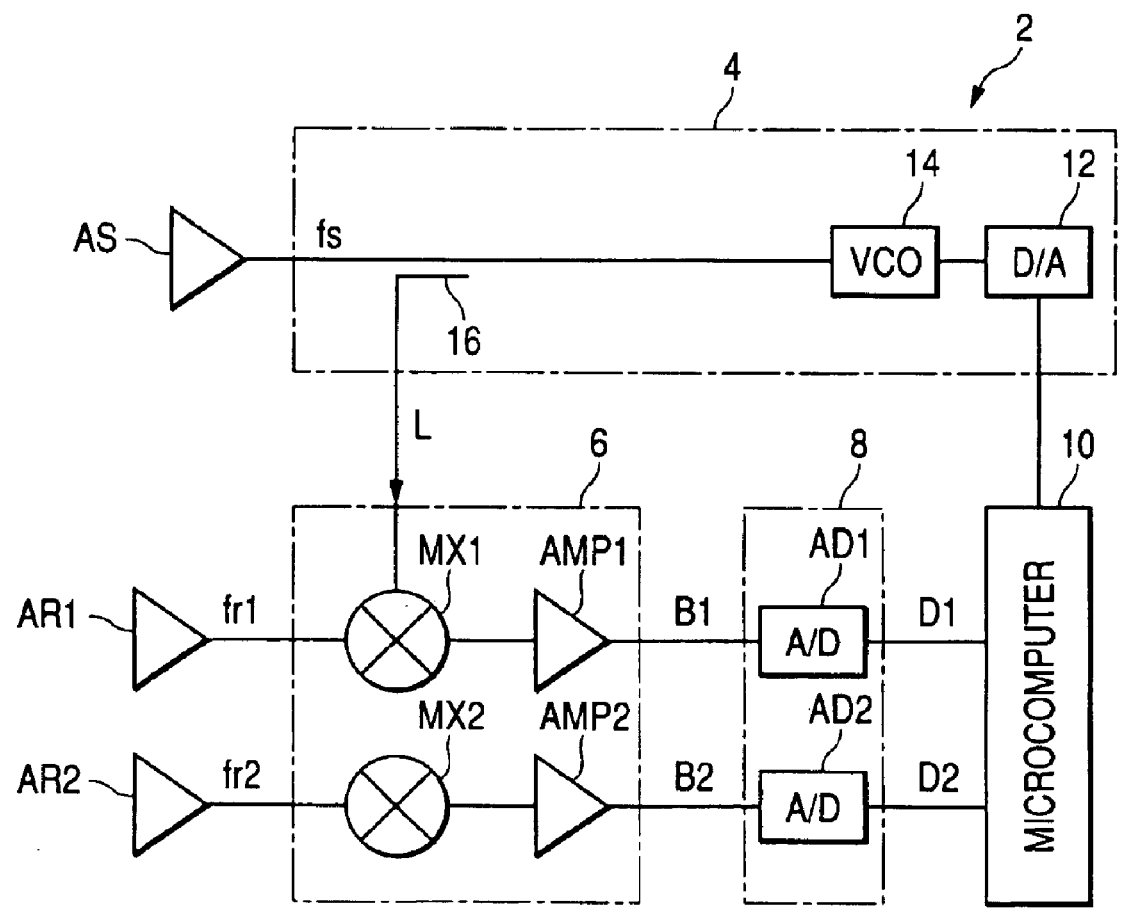
FIG. 1 is a block diagram which shows a radar system according to the first embodiment of the present invention.

Referring now to the drawings, particularly to FIG. 1, there is shown an automotive radar system 2 according to the present invention which may be employed in an automotive anti-collision system or automotive radar cruise control system to track obstacles in front of an automotive vehicle.

The radar system 2 includes a transmitter 4 which transmit a radar wave in a millimeter band from a transmit antenna AS. The transmitter 4 includes a D/A converter 12 and a voltage-controlled oscillator (VCO) 14, and a splitter 16. The D/A converter 12 is coupled with a microcomputer 10. The microcomputer 10 outputs a digital signal whose frequency increases, decreases, and is kept constant cyclically in a time domain. The D/A converter 12 converts the output of the microcomputer 10 into an analog signal and outputs it. The voltage-controlled oscillator 14 receives the output of the D/A converter 12 and uses it as a modulating signal to produce a high-frequency signal in a millimeter band which is modulated with the modulating signal. The splitter 16 splits in power the output of the voltage-controlled oscillator 14 into a transmit signal fs and a local signal L. The transmit signal fs is outputted from the transmit antenna AS as a radar wave to a frontal detection range. The local signal L is inputted to a receiver 6.

The radar system 2 also includes two receive antennas AR1 and AR2 which are located at a preselected interval away from each other. The receive antennas AR1 and AR2 each work to receive a return of the radar wave reflected from an object such as a preceding vehicle traveling ahead of the vehicle equipped with the radar system 2 (will also be referred to as a system vehicle below) and output signals fr1 and fr2 to a receiver 6, respectively.

The receiver 6 is made up of two mixers MX1 and MX2 and two amplifiers AMP1 and AMP2. The mixer MX1 mixes the local signal L with the signal fr1 received in the receive antenna AR1 to produce a beat signal B1 having a frequency component corresponding to a difference in frequency between the received signal fr1 and the local signal L. Similarly, the mixer MX2 mixes the local signal L with the signal fr2 received in the receive antenna AR2 to produce a beat signal B2 having a frequency component corresponding to a difference in frequency between the received signal fr2 and the local signal L. The amplifiers AMP1 and AMP2 work to amplify the beat signals B1 and B2 and output them to an A/D converter unit 8. The amplifiers AMP1 and AMP2 also work as filters to remove unwanted high-frequency components from the beat signals B1 and B2.

The A/D converter unit 8 is made up of two A/D converters AD1 and AD2. The A/D converters AD1 and AD2 work to sample the beat signals B1 and B2 cyclically to produce digital signals D1 and D2 which are, in turn, inputted to the microcomputer 10.

The microcomputer 10 consists essentially of a CPU, a ROM, and a RAM and works to process the digital signals D1 and D2 from the A/D converters AD1 and AD2 to determine the distance to, relative speed, and angular direction of a target such as a preceding vehicle. The microcomputer 10 also includes a digital signal processor which takes the fast Fourier transform (FFT) of the digital signals D1 and D2 in the above operation.

Figure 3:
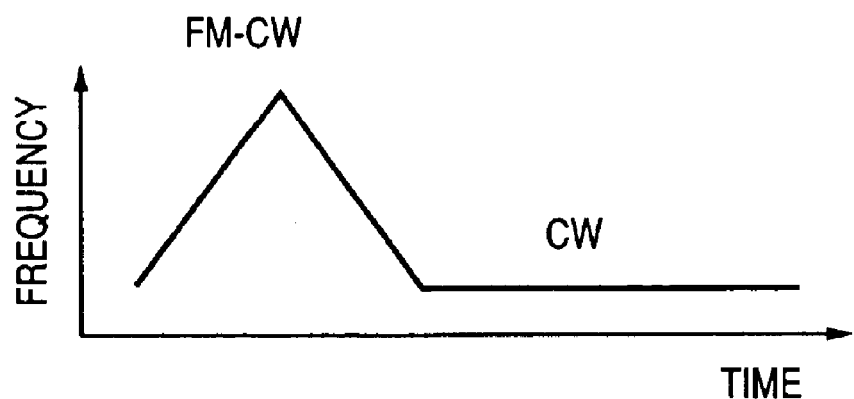
FIG. 3 is an illustration which shows a waveform of a radar wave emitted from the radar system of FIG. 1.

The radar system 2 produces, as clearly shown in FIG. 3, a radar wave (i.e., the transmit signal fs) through the transmitter 4 which has, as described above, the frequency modulated to rise, fall, and be kept constant cyclically and outputs it from the transmit antenna AS. If an object such as a preceding vehicle exists in front of the system vehicle, the radar wave is reflected thereby and returned back to the radar system 2. The receive antennas AR1 and AR2 receive such a radar return to produce the signals fr1 and fr2. The signals fr1 and fr2 are mixed with the local signal L in the mixers MX1 and MX2 to produce the beat signals B1 and B2 which have frequency components corresponding to differences in frequency between the received signals fr1 and fr2 and the local signal L, respectively. The A/D converters AD1 and AD2 sample the beam signals B1 and B2 in a preselected number of cycles in each of a range in which the transmit signal fs is rising in frequency (i.e., the modulated frequency-rising range), a range in which the transmit signal fs is falling in frequency (i.e., the modulated frequency-falling range), and a range in which the transmit signal fs is kept in frequency at a constant level (will also be referred to as a constant modulated frequency range below) and produce the digital signals D1 and D2 (will also be referred to as digital beat signals below) in each of the modulated frequency-rising and -falling ranges and the constant modulated frequency range which are, in turn, inputted to the microcomputer 10.

Figure 2:
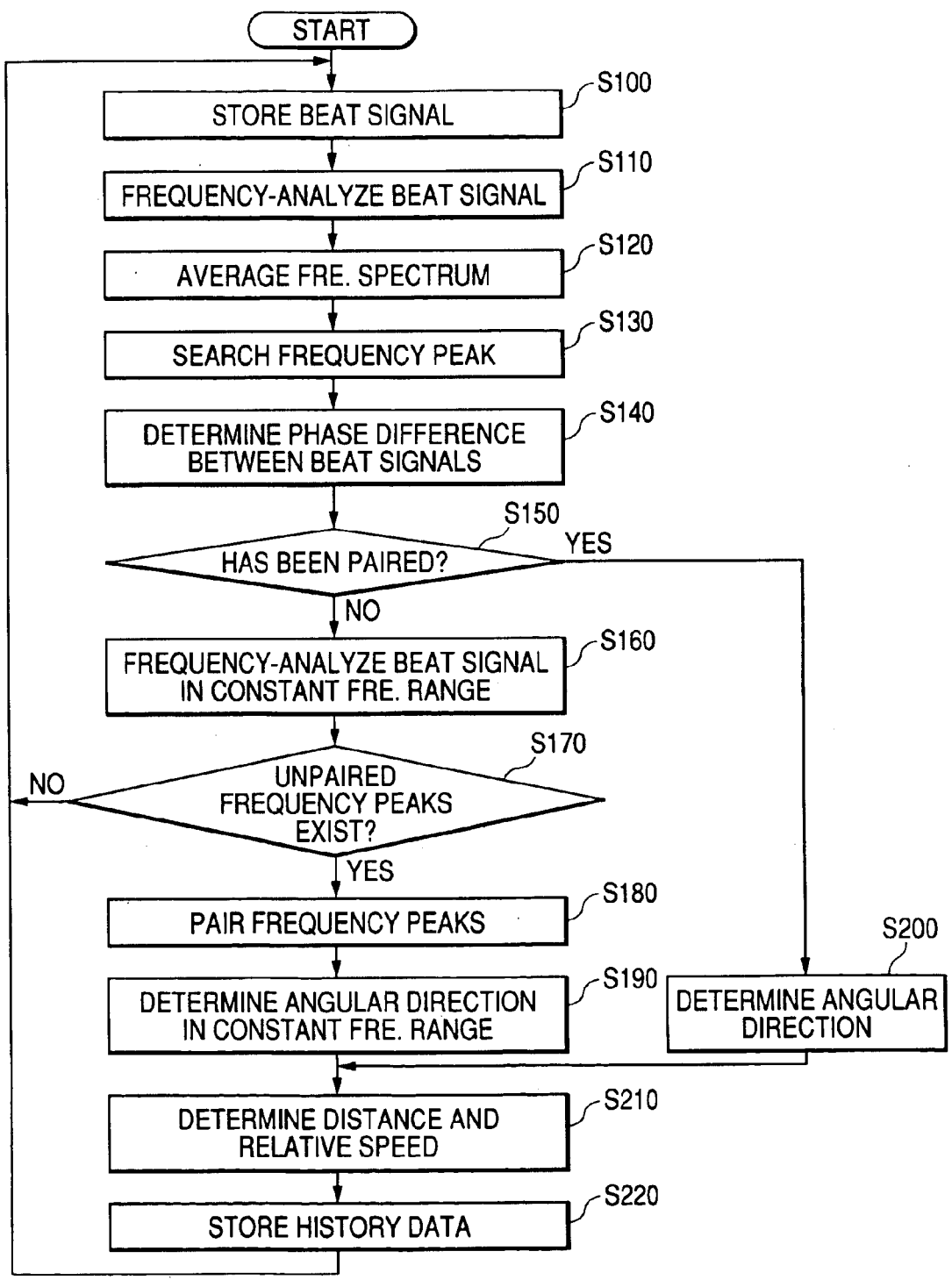
FIG. 2 is a flowchart of a program executed by the radar system, as illustrated in FIG. 1.

FIG. 2 is a flowchart of logical steps or program to be executed by the microcomputer 10 to determine the distance to, relative speed, and angular direction of a target.

Upon entering the program, the routine proceeds to step 100 wherein a preselected number of the digital beat signals D1 and D2 sampled in each of the modulated frequency-rising and -falling ranges and the constant modulated frequency range are stored in the RAM.

The routine proceeds to step 110 wherein the digital beat signals D1 and D2 in each of the modulated frequency-rising and -falling ranges are subjected to Fast Fourier Transform (FFT) to produce complex vectors in each of a series of frequencies of the beat signals B1 and B2 (i.e., the digital beat signals D1 and D2). Absolute values of the complex vectors indicate amplitudes (i.e., intensities) of frequency components of the beat signals B1 and B2. Specifically, the Fast Fourier Transform produces a frequency spectrum representing the intensity of each of the frequency components of the beat signals B1 and B2. The Fast Fourier Transform is performed on the beat signals B1 and B2 in the modulated frequency-rising and -falling ranges independently.

The routine proceeds to step 120 wherein the frequency spectra of the beat signals B1 and B2, as derived by the Fast Fourier Transform in step 110, are averaged in units of the frequency components in each of the modulated frequency-rising and -falling ranges. Specifically, the average of each of the frequency components in the modulated frequency-rising range and a corresponding one of the frequency components in the modulated frequency-falling range is calculated. The routine proceeds to step 130 wherein all of the averaged frequency components which show peaks are searched in each of the modulated frequency-rising and -falling ranges. The averaging operation in step 120 may be omitted. In this case, the frequency components of either or both of the beat signals B1 and B2 which show peaks are searched in each of the modulated frequency-rising and -falling ranges for use in making peak pairs or determining a phase difference between the beat signals B1 and B2, as described later. Frequencies of the peaks in the modulated frequency-rising range will be referred to as upward peak frequencies UPF below. Frequencies of the peaks in the modulated frequency-falling range will be referred to as downward peak frequencies DPF below.

Usually, electrical noises different from each other are added to the beat signals B1 and B2, respectively. Additionally, the beat signals B1 and B2 may also be shifted in the frequency peak from each other due to a difference in signal path between receiver channels or a difference in performance between the receive antennas AR1 and AR2. Such noises are minimized in step 120 by averaging frequency spectrum data indicating the intensities of the frequency components of the beat signals B1 and B2 to produce the respective upward and downward peak frequencies common to the beat signals B1 and B2. Specifically, the averaging operation serves to decrease the intensities of the noises down to levels lower than those of the upward and downward peak frequencies UPF and DPF, thereby improving the signal-to-noise (S/N) ratio. When the receive antennas AR1 and AR2 receive a radar return from the same object, the beat signals B1 and B2 usually have the same frequency peak in each of the modulated frequency-rising and -falling ranges. Therefore, once a frequency spectrum of one of the beat signals B1 and B2 is analyzed to find peak frequencies, similar peak frequencies may be viewed as appearing in a frequency spectrum of the other of the beat signals B1 and B2.

The search for each of the peak frequencies UPF and DPF common to the beat signals B1 and B2 in step 130 may be achieved by monitoring a variation in amplitude of each frequency component in time sequence to determine a frequency at which the variation in amplitude is reversed in sign.

Subsequently, the routine proceeds to step 140 wherein phase differences between the beat signals B1 and B2 at the upward and downward peak frequencies UPF and DPF are determined. This determination is made in the same manner, as described in the introductory part of this application, by finding phases of the beat signals B1 and B2 at the peak frequencies from angles which the complex vectors make with a real number axis and determining differences between the phases. If a plurality of frequency peaks appear in each of the modulated frequency-rising and -falling ranges, a phase difference between the beat signals B1 and B2 is determined at each of the frequency peaks.

The routine proceeds to step 150 wherein it is determined whether a combination(s) of the upward and downward peak frequencies UPF and DPF exists or not which meets conditions where a difference between an angular direction of an object calculated based on the phase difference between the beat signals B1 and B2 at the upward peak frequency UPF and that calculated based on the phase difference between the beat signals B1 and B2 at the downward peak frequency DPF, as derived in step 140, is smaller than a given value and where a difference in intensity of the beat signals B1 and B2 between the upward and downward peak frequencies UPF and DPF. If there are ones of the upward and downward peak frequencies UPF and DPF which meet such conditions, they are paired.

If there are a plurality of objects reflecting a radar wave emitted from the radar system 2, as many upward peak frequencies and downward peak frequencies UPF and DPF as the objects appear in the modulated frequency-rising and -falling ranges, respectively. It is, thus, necessary to combine the upward and downward peak frequencies UPF and DPF arising from each object correctly. In this embodiment, pairs of the upward and downward peak frequencies UPF and DPF are produced over cycles of the modulated frequency-rising and -falling ranges when a condition is met wherein the phase difference between the beat signals B1 and B2 at the upward peak frequency UPF is close to that at the downward peak frequency DPF. This is based on the fact that when the upward and downward peak frequencies UPF and DPF has arisen from the same object, the phase difference between the beat signals B1 and B2 at the upward peak frequency UPF is substantially identical with that at the downward peak frequency DPF.

The above pairing operation may also be made using an additional condition where a corresponding object falls in relative speed within a range of −200 km/h to 100 km/h.

If the pairs of upward and downward peak frequencies UFP and DPF are found in step 150, then the routine proceeds to step 200 wherein using a phase difference between the beat signals B1 and B2 in at least one of the modulated frequency-rising and -falling ranges at a corresponding one of the upward and downward peak frequencies UPF and DPF paired, the angular direction θ of a corresponding target is calculated according to Eq. (2), as described in the introductory part of this application.

The routine proceeds to step 210 wherein using the pairs of upward and downward peak frequencies UPF and DPF, the distance D to and relative speed V of the target are calculated according to Eqs. (5) and (6).

The routine proceeds to step 220 wherein the angular direction θ, the distance D, and relative speed V, as derived in steps 200 and 210 are stored as history data in a memory of the microcomputer 10. If there are a plurality of objects tracked by the radar system 2, the history data derived in each program cycle are classified according to the respective objects in the memory.

If there are the upward and downward peal frequencies UPF and DPF not paired in step 150, it is determined in step 160 and subsequent steps whether at least one of overlaps between the upward peak frequencies UPF and between the downward peak frequencies DPF arising from a plurality of objects tracked by the radar system 2 has made it impossible to make pairs of the upward and downward peak frequencies UPF and DPF or not. If such a condition is encountered, some of the upward and downward peak frequencies UPF and DPF which are to be paired correctly are searched to determine the distances D to, angular directions θ, and relative speeds V of the objects, respectively.

An example of the above case will be described below with reference to FIG. 4.

Figure 4:
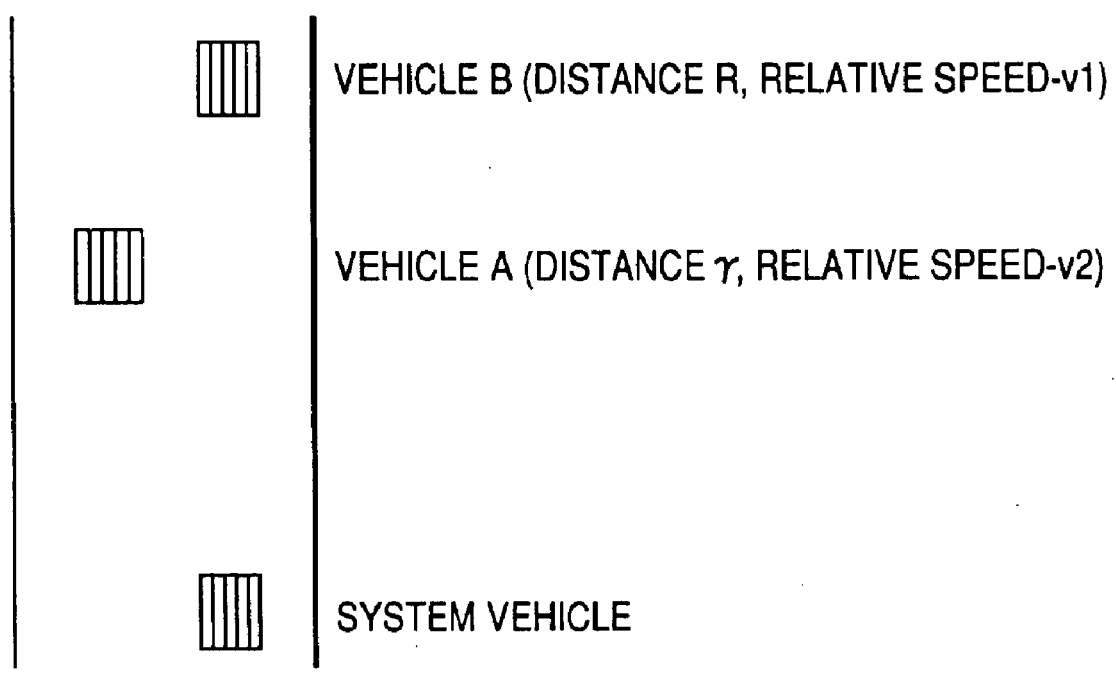
FIG. 4 is an explanatory view which shows an example in which peak frequencies arising from different objects overlap each other.

FIG. 4 illustrates the system vehicle equipped with the radar system 2 traveling on one of a plurality of traffic lanes of a road and two vehicles A and B traveling ahead of the system vehicle. It is also assumed that that the vehicle A is traveling at a distance r from the system vehicle and at a speed −v2 relative to the system vehicle, and the vehicle B is traveling at a distance R (>r) and at a speed of −v1 (|V1|<|V2|) relative to the system vehicle.

Figure 5:
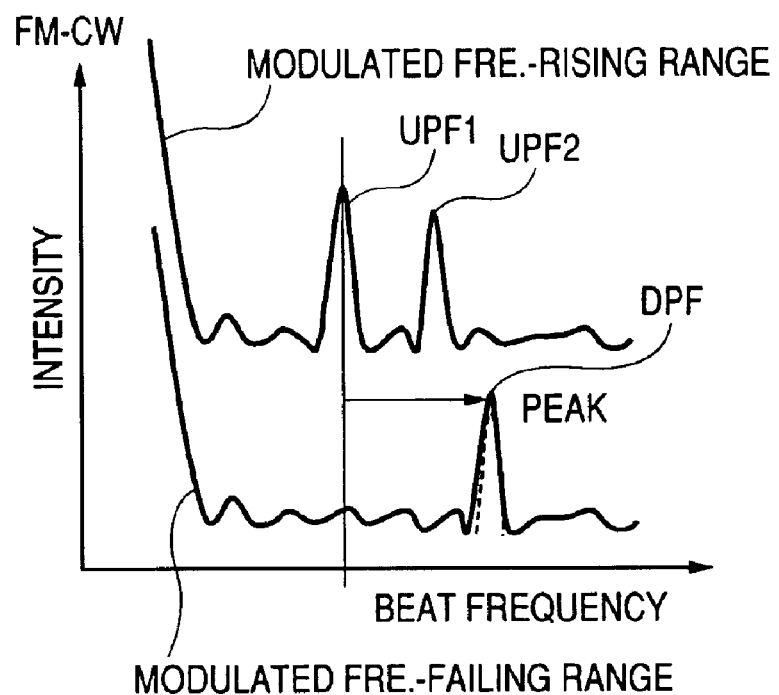
FIG. 5 is an illustration which shows waveforms of frequencies of a beat signal arising from the different objects, as illustrated in FIG. 4.

The vehicles A and B both have the speeds relative to the system vehicle, thus causing, as shown in FIG. 5, upward peak frequencies UPF1 and UPF2 arising from the vehicles A and B, respectively, shifted from corresponding downward peak frequencies DPF to appear. The upward peak frequency UPF1 is a peak frequency in the modulated frequency-rising range arising from the vehicle A. The upward peak frequency UPF2 is a peak frequency in the modulated frequency-rising range arising from the vehicle B. The vehicle A has the relative speed −v2 greater in an absolute value than the relative speed −v1 of the vehicle B, thus causing the upward peak frequency UPF1 to be shifted from the downward peak frequency DPF by a degree greater than the upward peak frequency UPF2. Further, the distance R between the system vehicle and the vehicle B is greater than the distance r between the system vehicle and the vehicle A, thus causing the upward peak frequency UPF2 and the downward peak frequency DPF produced by a radar return from the vehicle B to appear in a higher frequency band. The downward peak frequency DPF produced by a radar return from the vehicle A is Doppler-shifted to a higher frequency band, so that it may overlap the one arising from the vehicle B, as illustrated in the drawing. In this case, phases of the beat signals B1 and B2 at the downward peak frequency DPF arising from the vehicle A are combined with those arising from the vehicle B. This causes phase differences between the beat signals B1 and B2 at the downward peak frequencies DPF arising from the vehicles A and B to be different from phase differences between the beat signals B1 and B2 at the upward peak frequencies UPF1 and UPF2.

Figure 6:
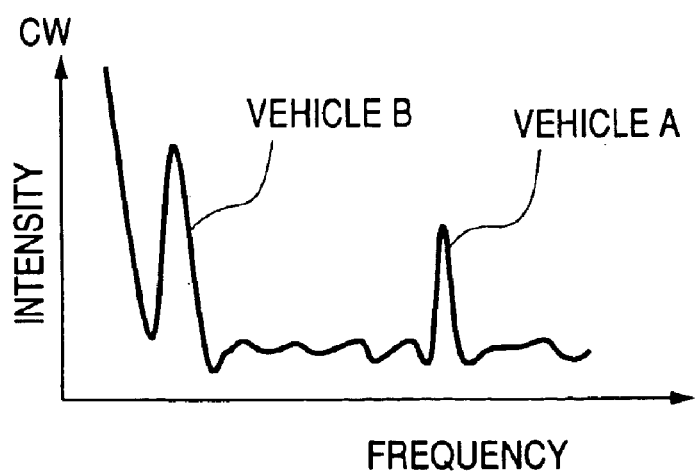
FIG. 6 is an illustration which shows a waveform of a frequency of a beat signal in a constant modulated frequency range in which a transmit signal is kept constant in frequency.

However, if the Fast Fourier Transform is performed on the beat signals B1 and B2 within the constant modulated frequency range, as labeled "CW" in FIG. 3, to produce frequency spectrum data, a difference between the relative speeds −v1 and −v2 of the vehicles A and B causes, as shown in FIG. 6, frequency peaks to appear as functions of the relative speeds −v1 and −v2, respectively. Specifically, it is possible to identify a plurality of objects tracked by the radar system 2 using the frequency spectrum data derived in the constant modulated frequency range.

Referring back to FIG. 2, in step 160, the digital beat signals D1 and D2 in the constant modulated frequency range are subjected to the Fast Fourier Transform (FFT) to produce frequency spectra of the beat signals B1 and B2. The routine proceeds to step 170 wherein it is determined whether there is a combination of the upward and downward peak frequencies UPF and DPF not paired in step 150 which are shifted form each other by a degree matching a relative speed of an object being tracked by the radar system 2 as indicated by a frequency peak in one of the frequency spectra derived in step 160 or not. This determination enables the presence of combinations of the upward and downward peak frequencies UPF and DPF arising from objects moving at the same relative speeds to be confirmed.

Specifically, in the example of FIG. 5, step 170 confirms the presence of a combination of the upward and downward peak frequencies UPF1 and DPF which are shifted from each other by a degree which is indicated by one of the frequency peaks, as illustrated in FIG. 6, in the frequency spectrum derived within the constant modulated frequency range and matches the relative speed −v2 of the vehicle A. Similarly, step 170 confirms the presence of a combination of the upward and downward peak frequencies UPF1 and DPF which are shifted from each other by a degree which is indicated by the other of the frequency peaks, as illustrated in FIG. 6, in the frequency spectrum derived within the constant modulated frequency range and matches the relative speed −v1 of the vehicle B.

After step 170, the routine proceeds to step 180 wherein ones of the upward and downward peak frequencies UPF and DPF which have determined in step 170 to meet the above conditions are paired.

The routine proceeds to step 190 wherein a phase difference between the beat signals B1 and B2 at the frequency peak derived in the constant modulated frequency range is calculated to determine the angular direction θ of each of tracked objects. The routine proceeds to step 210, as described above, wherein the distance D to and relative speed V of each of the objects are determined. The routine proceeds to step 220 wherein the angular direction θ, the distance D, and the relative speed V, as derived in steps 190 and 210 are stored in the memory.

As apparent from the above discussion, the radar system 2 works to continue to track objects even if the upward peak frequencies UPF or the downward peak frequencies DPF arising from a plurality of objects overlap each other.

A radar system according to the second embodiment will be described below. The radar system is identical in structure with the one shown in FIG. 1, and explanation thereof in detail will be omitted here.

The radar system of this embodiment is designed to prohibit the determination of the angular direction θ of an object using the beat signals B1 and B2 when it is determined that the degree of accuracy or a measure of correctness of waveform representing frequency peaks in at least one of the modulated frequency-rising and -falling ranges has been lowered, thereby eliminating an error in determining the angular direction θ of the object.

Figure 7:
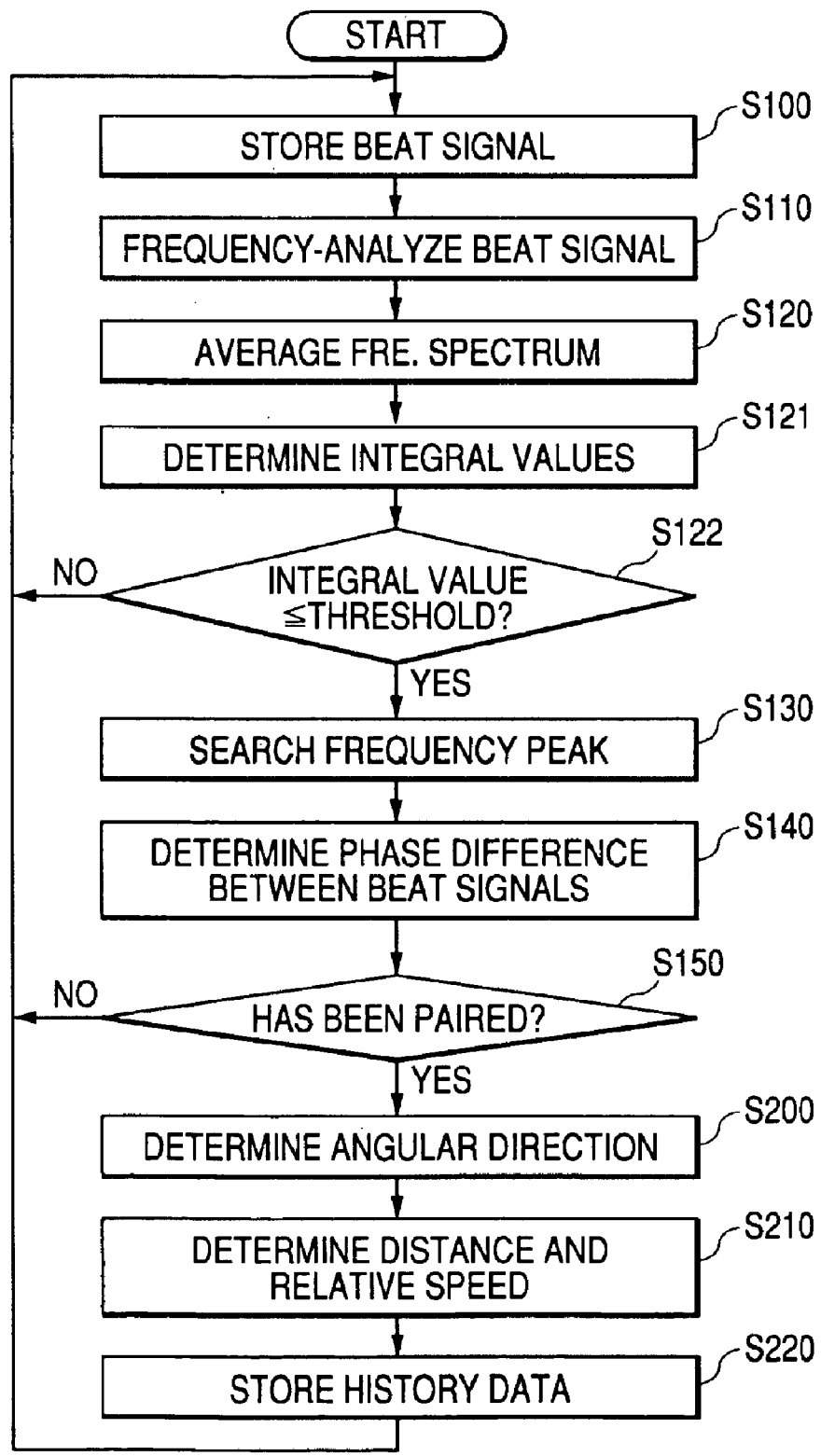
FIG. 7 is a flowchart of a program executed by a radar system according o the second embodiment of the invention.

FIG. 7 is a flowchart of a program executed to determine the distance D to, relative speed V, and angular direction θ of an object being tracked by the radar system of this embodiment. The same step numbers as employed in FIG. 2 will refer to the same operations, and explanation thereof in detail will be omitted here.

After the averaging operation is performed on the frequency spectrum data on the beat signals B1 and B2 in each of the modulated frequency-rising and -falling ranges in step 120, the routine proceeds to step 121 wherein the averaged frequency spectrum data in the modulated frequency-rising and -falling ranges are integrated to produce integral values, respectively (which will also be referred to as rising range integral value and a falling range integral value, respectively).

The routine proceeds to step 122 wherein it is determined whether each of the rising range integral value and the falling range integral value is smaller than or equal to a given threshold or not. If both are smaller than or equal to the threshold, then the routine proceeds to step 130 and subsequent steps to determine the distance D to, relative speed V, and angular direction θ of a object being tracked by the radar system. Alternatively, if a NO answer is obtained in step 122, then the routine returns directly back to step 100 without acquiring the above radar data on the object.

Figure 8:
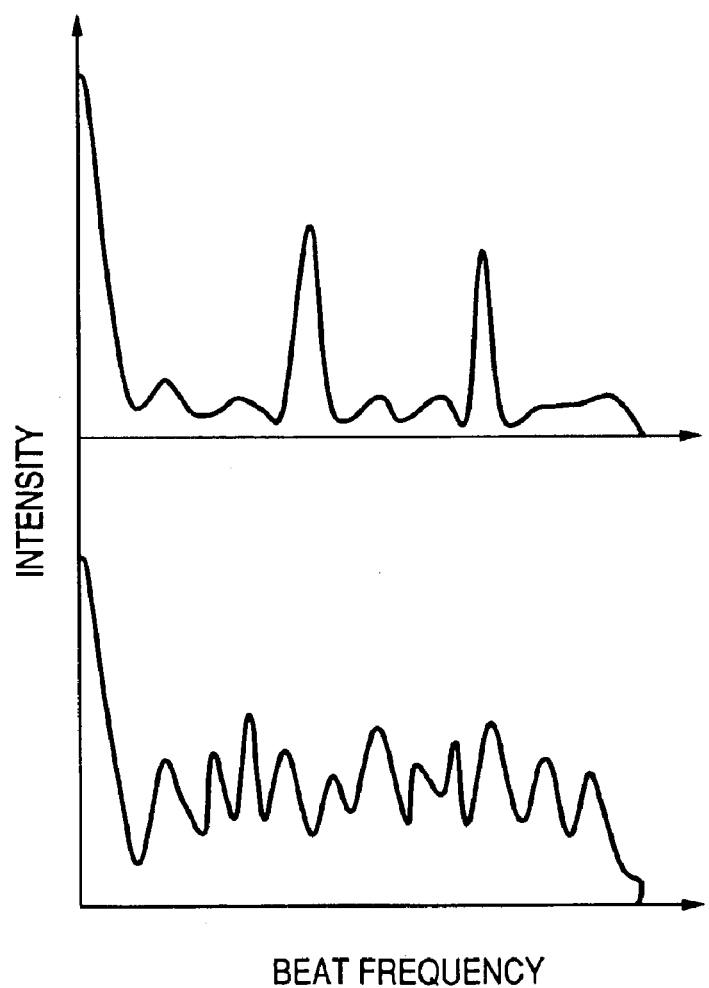
FIG. 8(a) is an illustration which shows a frequency spectrum of a beat signal when there are no radar returns from a roadside object such as a guardrail on a road.
FIG. 8(b) is an illustration which shows a frequency spectrum of a beat signal when there are many radar returns from a roadside object such as a guardrail on a road.

The rising and falling range integral values usually exceeds the threshold in step 122 when a number of frequency peaks appear which has arisen from roadside reflective objects such as guardrails as well as obstacles on a road or vehicles preceding the system vehicle to be tracked by the radar system or when addition of electrical noises to the beat signals B1 and B2 results in elevation in level thereof as a whole. FIGS. 8(a) and 8(b) show, as examples, frequency spectra when there are no radar returns from a guardrail on a road and when there are many such returns, When there are many radar returns from roadside reflective objects, it results in a difficulty in searing the frequency peaks of the beat signals B1 and B2 and pairing the upward and downward peak frequencies UPF and DPF correctly, which may lead to errors in determining the radar data such as the angular directions θ of the objects. In order to avoid this, the radar system of this embodiment works to verify the correctness of waveform representing the frequency peaks of the beat signals B1 and B2 using the rising and falling range integral values, as described above, and prohibit acquisition of the radar data.

The first modification of the second embodiment will be described below.

The radar system of this modification is designed to verify the correctness of waveform representing the frequency peaks of the beat signals B1 and B2, unlike the above second embodiment, by performing the Fast Fourier Transform on the beat signals B1 and B2 in the modulated frequency-rising and -falling ranges to search frequency peaks in frequency spectra thereof and determining a ratio of the number of the frequency peaks used to pair the upward and downward peak frequencies UPF and DPF correctly to a total number thereof.

Figure 9:
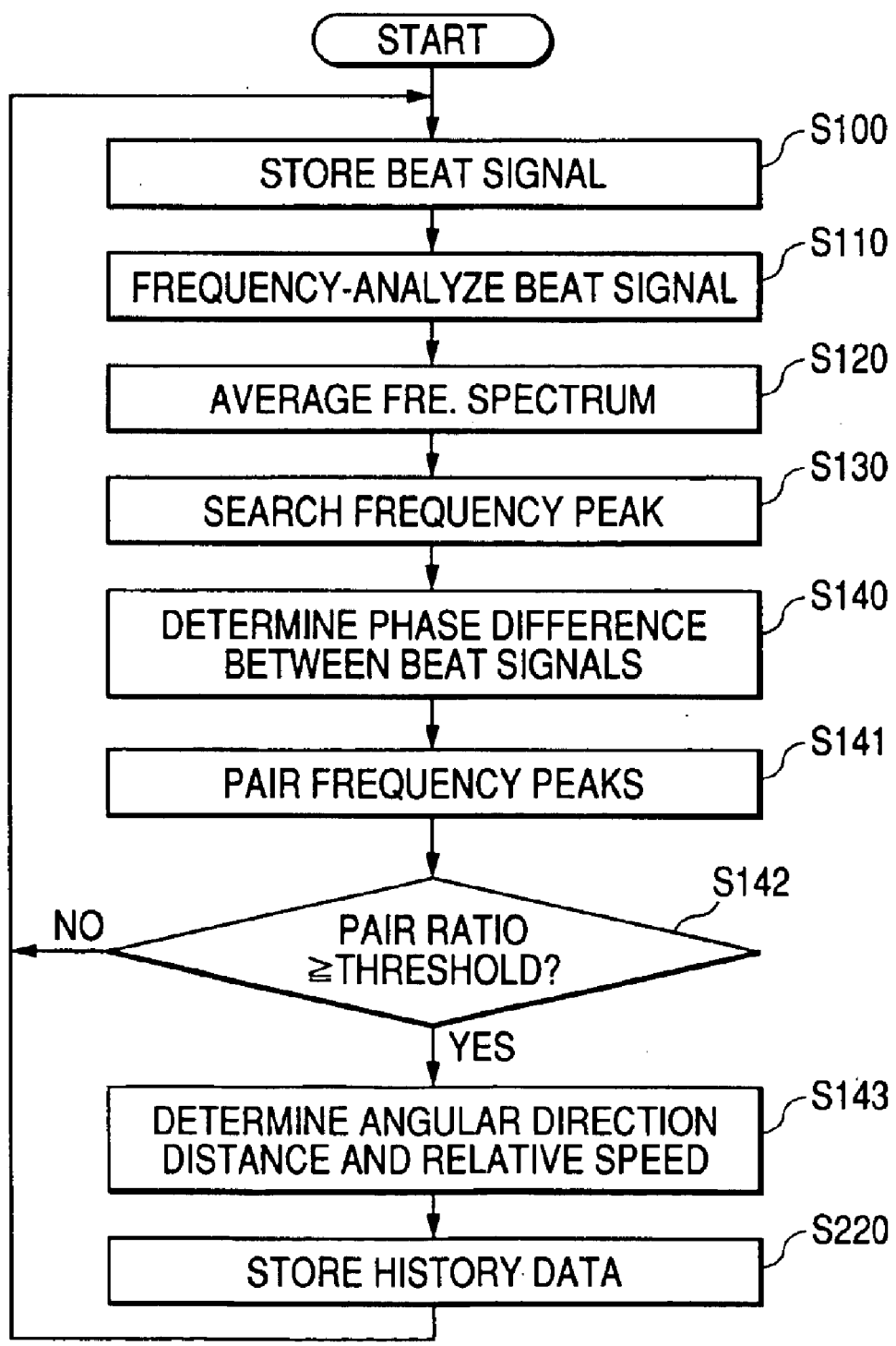
FIG. 9 is a flowchart of a program executed by a radar system in the first modified form of the second embodiment of the invention.

FIG. 9 shows a program executed by the radar system of this modification. The same step numbers as employed in the above embodiments will refer to the same operations, and explanation thereof in detail will be omitted here.

After the phase differences between the beat signals B1 and B2 at the upward and downward peak frequencies UPF and DPF are obtained in step 140, the routine proceeds to step 141 wherein all combinations of the upward and downward peak frequencies UPF and DPF are searched which meet a condition where a difference between the phase difference between the beat signals B1 and B2 at the upward peak frequency UPF and that at the downward peak frequency DPF is smaller than a given value.

The routine proceeds to step 142 wherein it is determined whether a ratio of the number of the pairs of the upward and downward peak frequencies UPF and DPF, as produced in step 141, to the number of all possible combinations of the upward and downward peak frequencies UPF and DPF, as derived in step 130, is greater than or equal to a given threshold or not. If a YES answer is obtained, then the routine proceeds to step 143 wherein the distances D to, relative speeds V, and angular directions θ of tracked objects using the pairs of the upward and downward peak frequencies UPF and DPF, as derived in step 141. Alternatively, if a NO answer is obtained meaning that many of the upward and downward peak frequencies UPF and DPF have arisen from roadside reflective objects, so that they overlap each other in the frequency domain or much electrical noise is added to the beat signals B1 and B2, then the routine returns back to step 100, that is, the radar system prohibits the acquisition of the radar data on all tracked objects.

The second modification of the second embodiment will be described below.

The radar system of this modification is designed to verify the correctness of waveform representing the frequency peaks of the beat signals B1 and B2 by performing the Fast Fourier Transform on the beat signals B1 and B2 in the modulated frequency-rising and -falling ranges to search frequency peaks in frequency spectra thereof and finding the density thereof (i.e., the number of the frequency peaks in a specified frequency band).

Figure 10:
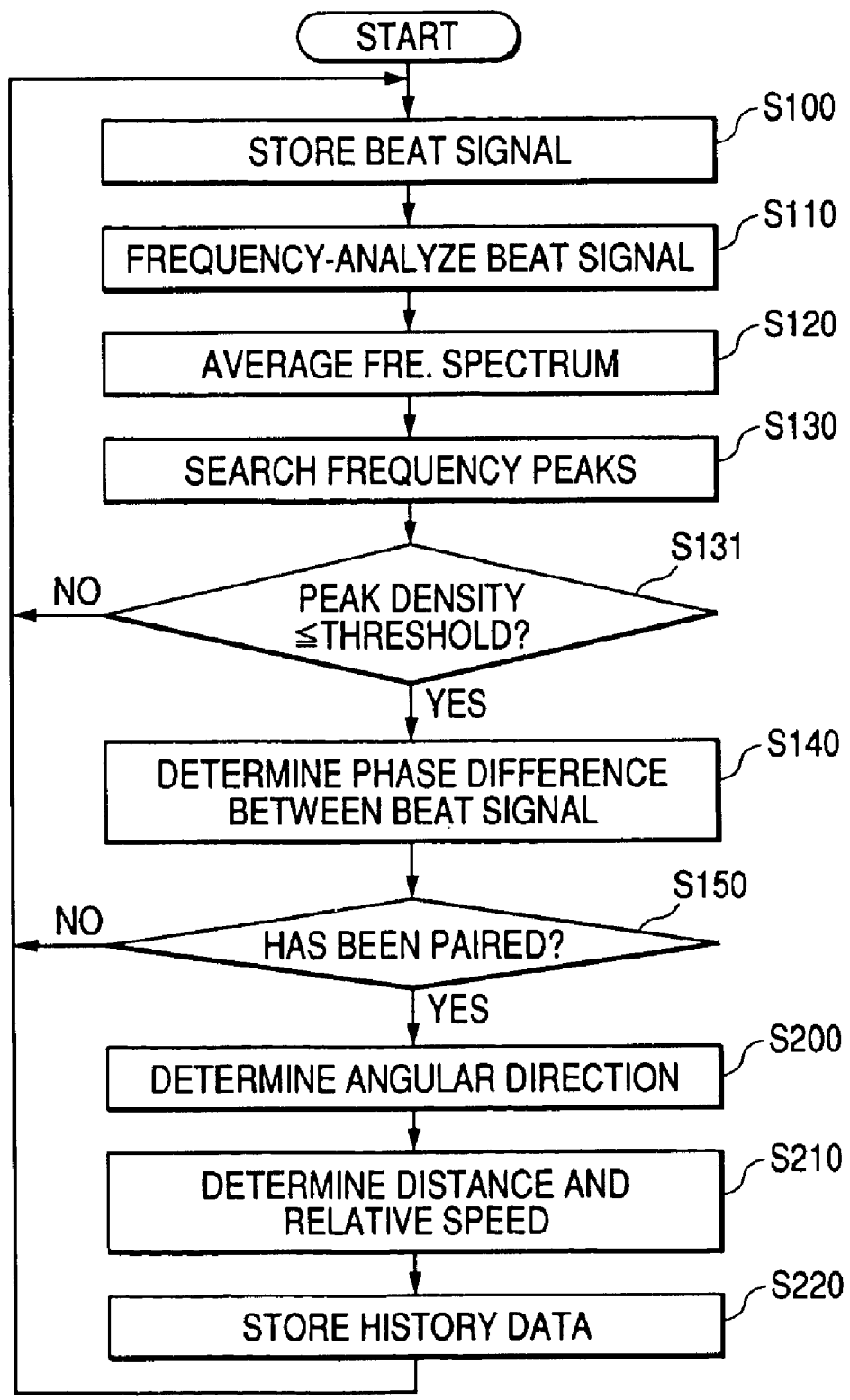
FIG. 10 is a flowchart of a program executed by a radar system in the second modified form of the second embodiment of the invention.

FIG. 10 shows a program executed by the radar system of this modification. The same step numbers as employed in the above embodiments will refer to the same operations, and explanation thereof in detail will be omitted here, After the upward and downward peak frequencies UPF and DPF are searched in step 130, the routine proceeds to step 131 wherein the number of the upward peak frequencies UPF and the number of the downward peak frequencies DPF within a given frequency band are calculated to determine whether they are smaller than or equal to a given threshold or not. If a YES answer is obtained meaning that either of the number of the upward peak frequencies UPF and the number of the downward peak frequencies DPF is smaller than or equal to the given threshold, then the routine proceeds to step 140 and following steps to determine the distances D to, relative speeds V, and angular directions θ of tracked objects. Alternatively, if a NO answer is obtained meaning that many of the upward and downward peak frequencies UPF and DPF have arisen from roadside reflective objects, then the routine returns back to step 100, that is, the radar system prohibits the determination of the radar data on all tracked objects. The determination in step 131 is based on the fact that the possibility that the number of frequency peaks arising from objects such as preceding vehicles required to be tracked by the radar system will exceed the threshold value is usually low.

The third modification of the second embodiment will be described below.

The radar system of this modification is designed to estimate or calculate changes in the frequency peaks of the beat signals B1 and B2 in the modulated frequency-rising and -falling ranges based on the history data on the distance D to, relative speed V, and the angular direction θ of each object and, if it may be determined that the possibility that the frequency peaks arising from a plurality of objects will overlap each other is high, conclude that the correctness of waveform representing the frequency peaks does not meet a desired level, and prohibit the acquisition of the radar data on objects now being tracked.

Figure 11:
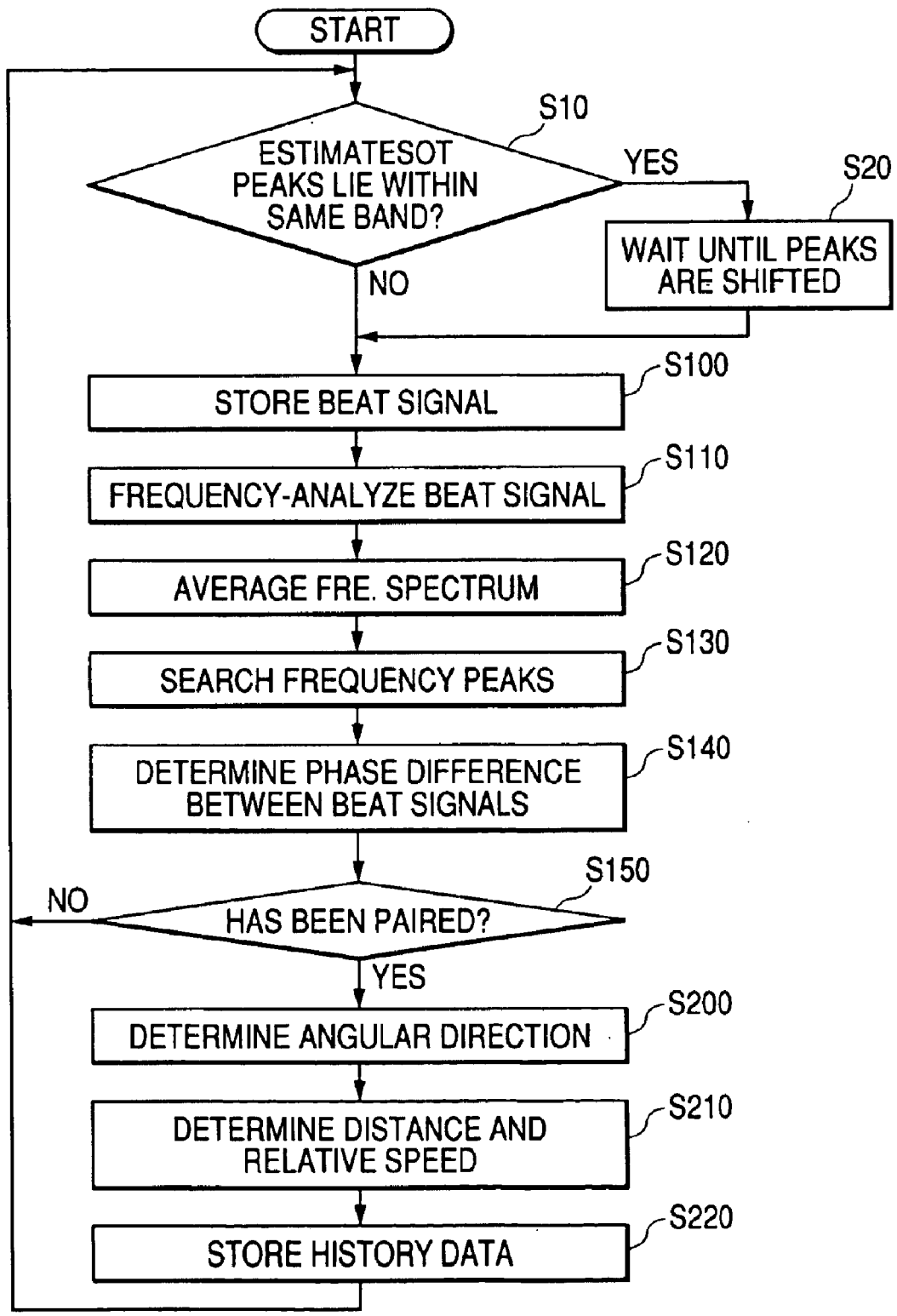
FIG. 11 is a flowchart of a program executed by a radar system in the third modified form of the second embodiment of the invention.

FIG. 11 shows a program executed by the radar system of this modification. The same step numbers as employed in the above embodiments will refer to the same operations, and explanation thereof in detail will be omitted here.

After entering the program, the routine proceeds to step 10 wherein the history data on the distance D to, relative speed V, and the angular direction θ of each tracked object, as stored in the memory in step 220 in previous program cycles, is looked up to estimate frequencies at which frequency components of the beat signals B1 and B2 produced by a radar return from each object will show peaks, and it is determined whether the estimated frequency peaks arising from the plurality of objects lie within the same frequency band or not. Such estimation is achieved by adding or subtracting changes in the distance D to and relative speed V stored as the history data to or from the last derived the distance D to and relative speed V, respectively, defining them as estimates thereof, and back-calculating the frequency peaks according to Eqs. (3) to (6), as described above, using the estimates.

If it is determined that the estimated frequency peaks arising from the different objects overlap each other, then the routine proceeds to step 20 and waits for the time required for the estimated frequency peaks to be shifted in the frequency band thereof from each other. Subsequently, the routine proceeds to step 100, as described above.

As already described, if frequency peaks arising from different objects overlap each other, it will cause phases of the beat signals B1 and B2 at the frequency peaks to be combined with each other undesirably, thus requiring analyzing the beat signals B1 and B2 in the constant modulated frequency range in order to make pairs of the upward and downward peak frequencies UPF and DPF correctly. When such a condition exists, the radar system of this modification concludes that the correctness of waveform representing the frequency peaks is low and prohibits the radar data from being acquired.

The estimation of the frequency peaks may also be achieved using the history data on the distance D to, relative speed V, and angular direction θ of each object. Additionally, the upward and downward peak frequencies UPF and DPF may also be added to the history data for facilitating the ease of estimation of the frequency peaks.

The fourth modification of the second embodiment will be described below.

The radar system of this modification is equipped with at least one of an image capture device for capturing an image of a frontal view to which a radar wave is outputted, a navigation system for locating the system vehicle, and a steering position sensor for measuring a steered angular position of a steering wheel of the system vehicle and works to monitor the presence of a condition unsuitable for the radar system to acquire the radar data on a tracked object and, if such a condition is met, prohibit the acquisition of the radar data.

Figure 12:
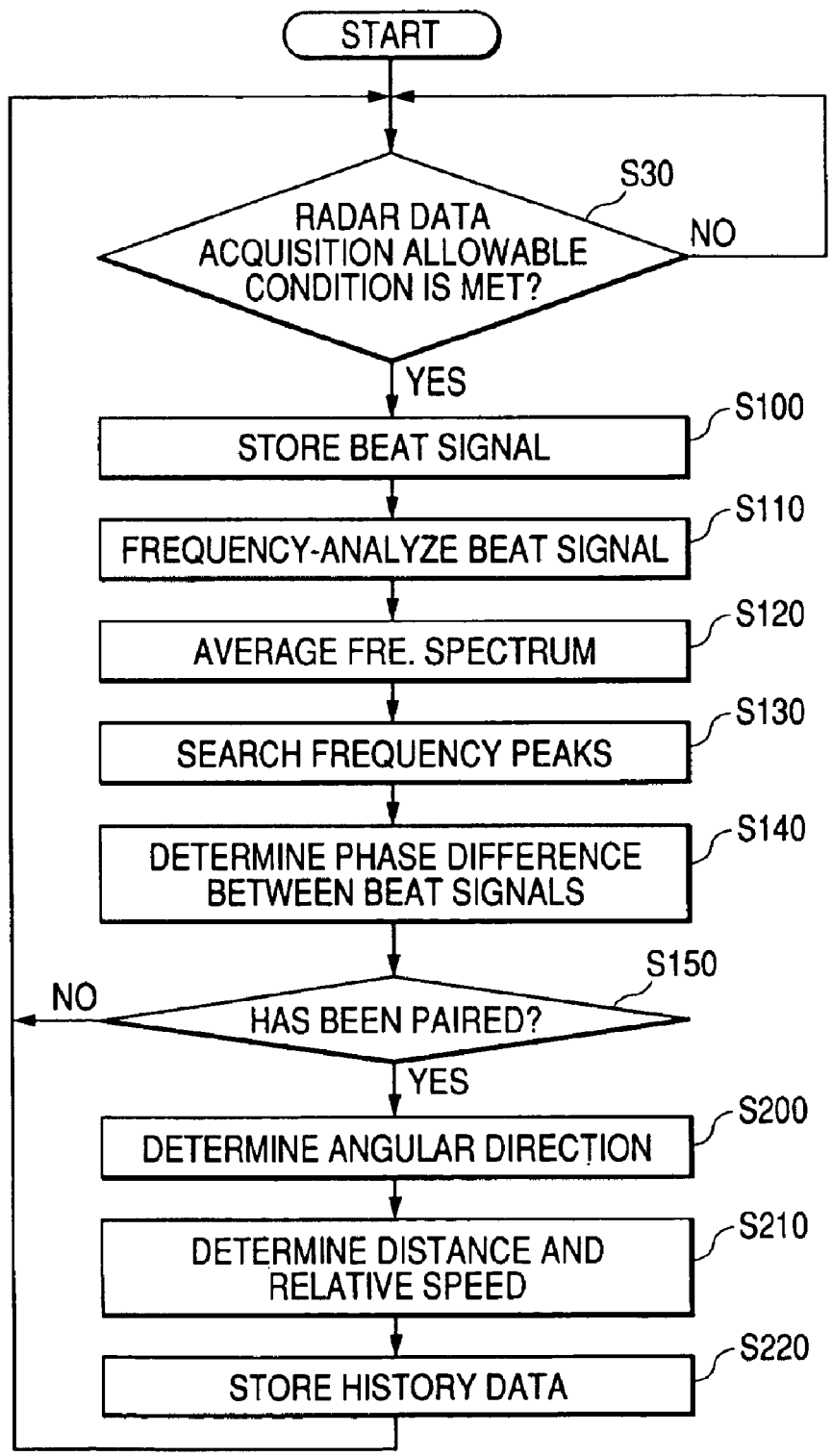
FIG. 12 is a flowchart of a program executed by a radar system in the fourth modified form of the second embodiment of the invention.
Figure 13:
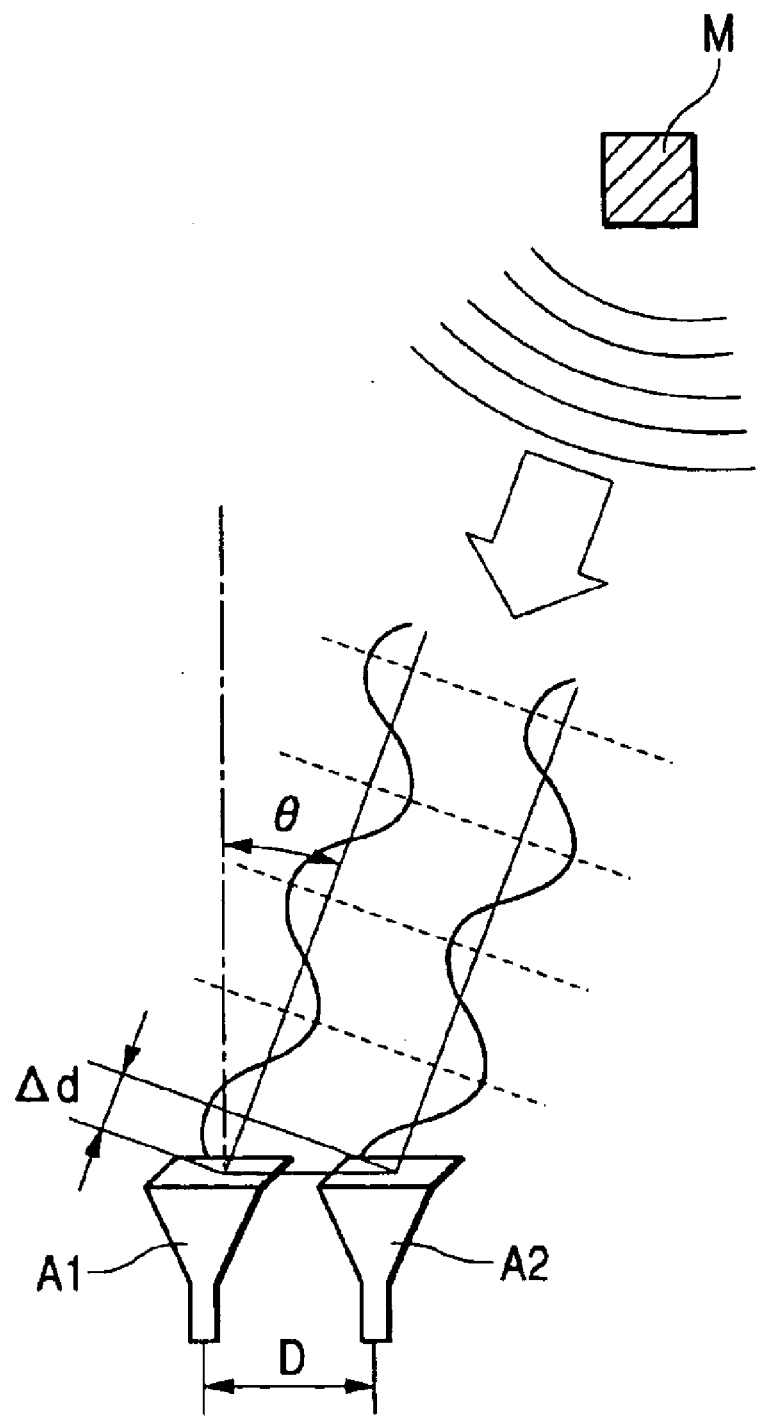
FIG. 13 is an explanatory view for explanation of the principle of determining the angular direction of an object in a monopulse radar.
Figure 14A:
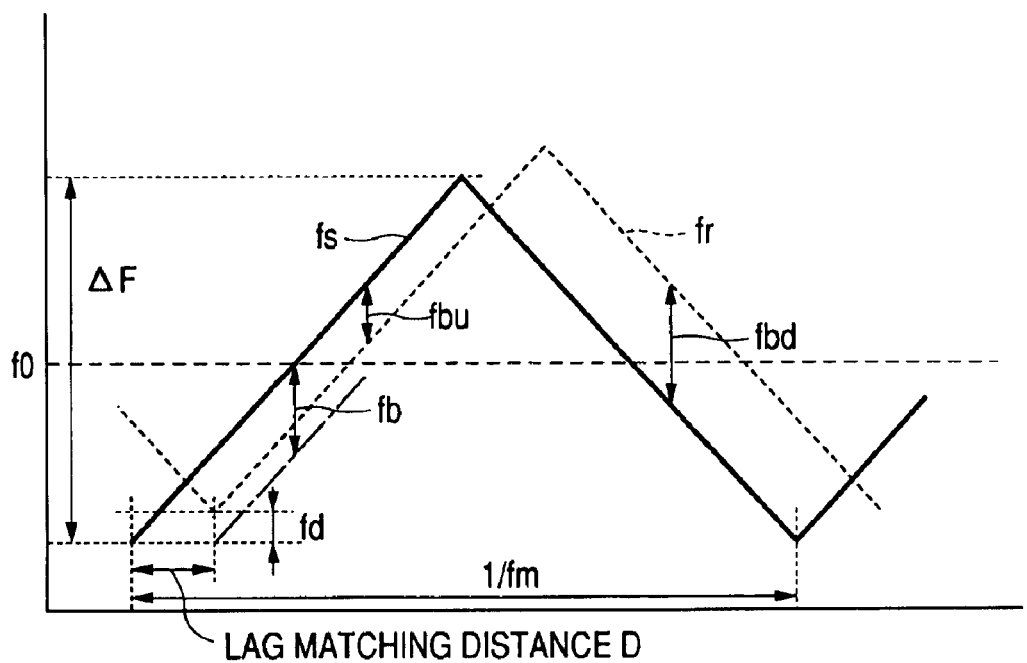
FIG. 14(a) is a graph which shows waveforms of transmit and receive signals in an FMCW radar.
Figure 14B:
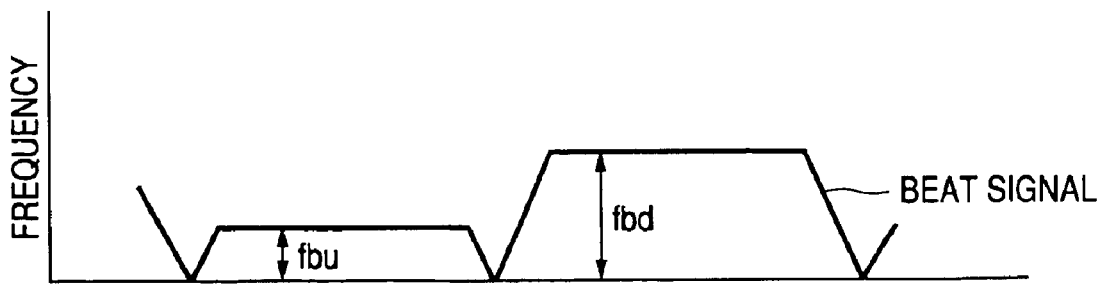
FIG. 14(b) is a graph which shows a frequency of a beat signal produced by the transmit and receive signal, as illustrated in FIG. 14(a).

FIG. 12 shows a program executed by the radar system of this modification. The same step numbers as employed in the above embodiments will refer to the same operations, and explanation thereof in detail will be omitted here.

After entering the program, the routine proceeds to step 30 wherein it is determined whether at least one of the image of a view in front of the system vehicle captured by the image capture device, the position of the system vehicle found by the navigation system, and the angular position of the steering wheel measured by the steering position sensor indicates a condition suitable for the radar system to acquire the radar data on a tracked object or not. If a YES answer is obtained, then the routine proceeds to step 100 to acquire the digital beat signals D1 and D2.

For example, when having confirmed the presence of an object such as a guardrail on a road or a side wall of a tunnel which reflects a radar wave at an intensity higher than a given threshold using the image captured by the image capture device, the radar system prohibits the acquisition of the radar data on tracked objects. This is because the presence of the guardrail or side wall of the tunnel will result in a difficulty in searching the frequency peaks arising from an object required to be tracked by the radar system correctly.

When having confirmed that the system vehicle is now traveling within a tunnel using data obtained from the navigation system, the radar system prohibits the acquisition of the radar data for the same reason as described above.

Further, when having confirmed that a steered angular position of the steering wheel is greater than a preselected value using a measurement of the steering position sensor, the radar system prohibits the acquisition of the radar data. This is because when the steering wheel is turned greatly, the radar system may be viewed as receiving a number of radar returns from a roadside object such as a guardrail. The steering position sensor may be implemented by a rotary encoder installed on a steering shaft of the system vehicle. The steered angular position of the steering wheel may alternatively be calculated indirectly based on a difference in speed between right and left road wheels.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. A radar apparatus for a vehicle comprising:
   a transmitter working to emitting a transmit signal in the form of a radar wave which has a frequency so modulated as to increase, decrease, and be kept constant in sequence;
   a first and a second receiver circuit including a first and a second antenna located at a given interval away from each other, the first and second receiver circuits each working to receive a return of the radar wave from an object to produce receive signals and produce a first and a second beat signal each of which has a frequency corresponding to a difference in frequency between the transmit signal and a corresponding one of the receive signals, each of the first and second beat signals having a first frequency component in a modulated frequency-rising range wherein the frequency of the transmit signal increases, a second frequency component in a modulated frequency-falling range wherein the frequency of the transmit signal decreases, and a third frequency component in a constant modulated frequency range wherein the frequency of the transmit signal is kept constant; and a signal processor working to determine an angular direction of the object using the receive signals provided by said first and second receiver circuits, said signal processor including a first and a second angular direction determining section, the first angular direction determining section determining the angular direction of the object based on a phase difference between the first and second beat signals at a peak frequency that is at least one of frequencies of the first and second beat signals in at least one of the modulated frequency-rising and -falling ranges which have peaks, when peak frequencies that are frequencies of the first and second beat signals arising form a plurality of objects which have peaks in at least one of the modulated frequency-rising and -falling ranges overlap each other, the second angular direction determining section determining the angular direction of the object using a phase difference between the first and second beat signals at peak frequencies that are frequencies of the first and second beat signals in the constant modulated frequency range.

2. A radar apparatus as set forth in claim 1, wherein the first angular direction determining section works to determine as the angular direction of the object a first angular direction based on a phase difference between the first and second beat signals at the peak frequency in the modulated frequency-rising range and a second angular direction based on a phase difference between the first and second beat signals at the peak frequency in the modulated frequency-falling range, and wherein when a first condition where a difference between the first and second angular directions is smaller than a given value and a second condition where a difference in intensity between the peak frequencies in the modulated frequency-rising and -falling ranges is smaller than a given value are both met, said signal processor determines the peak frequencies in the modulated frequency-rising and -falling ranges to have arisen from the same object and combines the peak frequencies in the modulated frequency-rising and -falling rages to produce a peak frequency pair, said signal processor determining a distance to and a relative speed of the object using the peak frequency pair, and wherein when the first and second conditions are not encountered, the second angular direction determining section determines the angular direction of the object.

3. A radar apparatus as set forth in claim 1, wherein the second angular direction determining section determines whether the peak frequencies in the modulated frequency-rising and -falling ranges are shifted from each other by a degree matching a relative speed of the object as indicated by the peak frequencies in the constant modulated frequency range, if a positive answer is obtained, the second angular direction determining section determines the angular direction of the object using the peak frequencies in the constant modulated frequency range.

4. A radar apparatus as set forth in claim 3, wherein if it is determined that the peak frequencies in the modulated frequency-rising and -falling ranges are shifted from each other by the degree matching the relative speed of the object as indicated by the peak frequencies in the constant modulated frequency range, said signal processor combines the shifted peak frequencies to produce a peak frequency pair for use in determining the angular direction of the object.

5. A radar apparatus for a vehicle comprising:

a transmitter working to emitting a transmit signal in the form of a radar wave which has a frequency so modulated as to increase and decrease in sequence;

a first and a second receiver circuit including a first and a second antenna located at a given interval away from each other, the first and second receiver circuits each working to receive a return of the radar wave from an object to produce receive signals and produce a first and a second beat signal each of which has a frequency corresponding to a difference in frequency between the transmit signal and a corresponding one of the receive signals, each of the first and second beat signals having a first frequency component in a modulated frequency-rising range wherein the frequency of the transmit signal increases and a second frequency component in a modulated frequency-falling range wherein the frequency of the transmit signal decreases; and a signal processor working to determine an angular direction of the object using the receive signals provided by said first and second receiver circuits, said signal processor being designed to perform a angular direction determining function and a prohibiting function, the angular direction determining function serving to determine the angular direction of the object based on a phase difference between the first and second beat signals at a peak frequency that is at least one of frequencies of the first and second beat signals in at least one of the modulated frequency-rising and -falling ranges which have peaks, the prohibiting function serving to verify a measure of correctness of waveform representing the peak frequencies in each of the modulated frequency-rising and -falling ranges, when the measure of correctness in each of the modulated frequency-rising and -falling ranges is lower than a given degree, the prohibiting function being performed to prohibit the angular direction determining function from determining the angular direction of the object.

6. A radar apparatus as set forth in claim 5, wherein when an integral value of at least one of the first and second beat signals in each of the modulated frequency-rising and -falling ranges is smaller than a given threshold, the prohibiting function of said signal processor is performed to prohibit the angular direction determining function from determining the angular direction of the object.

7. A radar apparatus as set forth in claim 5, wherein said signal processor stores therein history data on the peak frequencies in at least one of the modulated frequency-rising and -falling ranges, and wherein when said signal processor has an assumption that some of the peak frequencies will overlap each other based on changes in the peak frequencies stored as the history data, said signal processor determines that the measure of correctness is lower than the given degree and performs the prohibiting function to prohibit the angular direction determining function from determining the angular direction of the object.

8. A radar apparatus as set forth in claim 5, further comprising an image capture device which captures an image of a view to which the radar wave is emitted, and wherein when the presence of an object reflecting the radar wave at an intensity higher than a given threshold is confirmed from the captured image, said signal processor determines that the measure of correctness is lower than the given degree and performs the prohibiting function to prohibit the angular direction determining function from determining the angular direction of the object.

9. A radar apparatus as set forth in claim 5, further comprising a vehicle position determining device which determines a position of a vehicle equipped with the radar apparatus, and wherein when the position as determined by the vehicle position determining device indicates the fact that the vehicle is traveling in a tunnel, said signal processor determines that the measure of correctness is lower than the given degree and performs the prohibiting function to prohibit the angular direction determining function from determining the angular direction of the object.

10. A radar apparatus as set forth in claim 5, further comprising a steering position sensor which measures an angular position of a steering wheel of a vehicle equipped with the radar apparatus, and wherein when the steering position sensor indicates that the angular position of the steering wheel is greater than a given threshold, said signal processor determines that the measure of correctness is lower than the given degree and performs the prohibiting function to prohibit the angular direction determining function from determining the angular direction of the object.

11. A radar apparatus as set forth in claim 5, wherein the angular direction determining function serves to determine as the angular direction of the object a first angular direction based on a phase difference between the first and second beat signals at the peak frequencies in the modulated frequency-rising range and a second angular direction based on a phase difference between the first and second beat signals at the peak frequencies in the modulated frequency-falling range, and wherein when a first condition where a difference between the first and second angular directions is smaller than a given value and a second condition where a difference in intensity between the peak frequencies in the modulated frequency-rising and -falling ranges is smaller than a given value are met, said signal processor determines the peak frequencies in the modulated frequency-rising and -falling ranges to have arisen from the same object and combines the peak frequencies in the modulated frequency-rising and -falling rages to produce a peak frequency pair, said signal processor determining a distance to and a relative speed of the object using the peak frequency pair, and wherein when the number of peak frequency pairs as produced by said signal processor is smaller than a given value, said signal processor determines that the measure of correctness is lower than the given degree and performs the prohibiting function to prohibit the angular direction determining function from determining the angular direction of the object.

12. A radar apparatus as set forth in claim 5, wherein when the number of the peak frequencies in at least one of the modulated frequency-rising and -falling ranges is smaller than a given value, said signal processor determines that the measure of correctness is lower than the given degree and performs the prohibiting function to prohibit the angular direction determining function from determining the angular direction of the object.

* * * * *